United States Patent

[11] 3,576,316

[72] Inventor Joseph Richard Kaelin
 Villa Seeburg, Buochs, Nidwalden, Switzerland
[21] Appl. No. 826,162
[22] Filed May 20, 1969
[45] Patented Apr. 27, 1971
[32] Priority May 28, 1968
[33] Switzerland
[31] 7886/68

[54] APPARATUS FOR SURFACE AERATION AND CIRCULATION OF LIQUID
7 Claims, 8 Drawing Figs.

[52] U.S. Cl. .............................................. 261/91,
 210/219, 210/242, 261/120
[51] Int. Cl. ....................................... B01o 47/16
[50] Field of Search .......................................... 210/219,
 242; 261/91, 120

[56] References Cited
 UNITED STATES PATENTS
 940,103 11/1969 Feld ............................. 261/91
 1,026,946 5/1912 Comins ....................... 261/91
 3,479,017 11/1969 Thikotter ..................... 261/91

Primary Examiner—Tim R. Miles
Assistant Examiner—Steven H. Markowitz
Attorney—McGlew and Toren ABSTRACT: Apparatus for the surface aeration and circulation of liquid, e.g. for the treatment of sewage comprises an aeration rotor which, in use, is partially submerged in the liquid to be treated and revolves about a vertical axis. The rotor is equipped with a number of flow passageways for the liquid formed between radial blades and spaced upper and lower spaced rotor walls. The flow passageways are curved in their vertical plane by approximately 90° so as to deflect outwardly the liquid entering said flow passageways from below through inlets arranged in a circle around the axis of the rotor the liquid then being discharged radially outwards in substantially horizontal direction through outlet openings arranged on the outer perimeter of the rotor situated on a larger diameter compared with the diameter on which the inlets are arranged. The outer circumference of the portion of the rotor submerged in the liquid is formed as a straight frustoconical surface, said lower rotor wall forming a limiting wall of said curved flow passageway and frustoconical surface defining an annular hollow space extending around the rotor to provide for buoyancy in order to reduce the weight of the rotor when immersed in the liquid in operating position.

INVENTOR.
JOSEPH RICHARD KAELIN

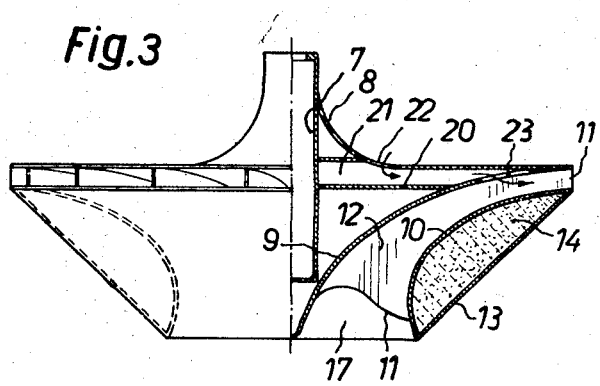
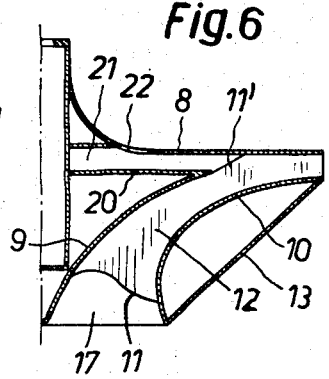
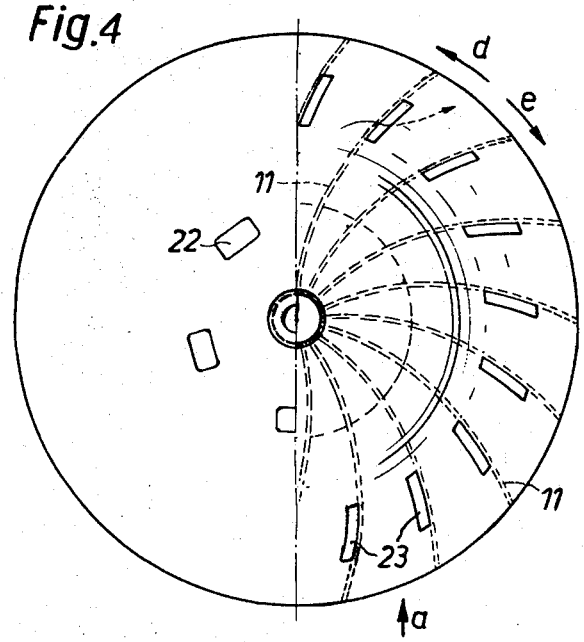
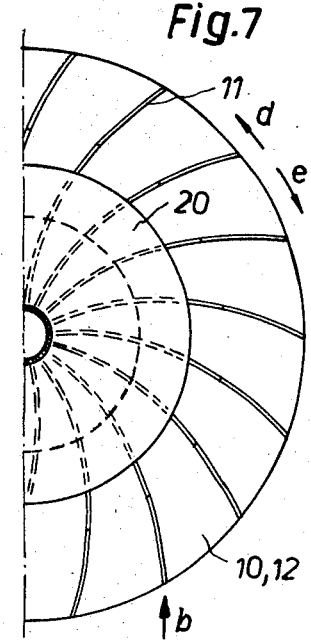
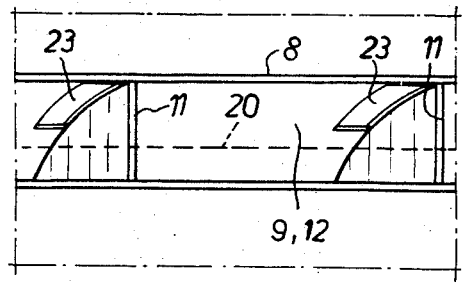
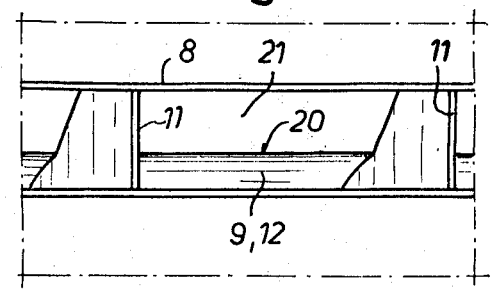
INVENTOR.
JOSEPH RICHARD KAELIN

APPARATUS FOR SURFACE AERATION AND CIRCULATION OF LIQUID

This invention relates to apparatus for surface aeration and circulation of liquid in a tank, particularly of sewage and the like, comprising a rotor which in use is partially submerged in the liquid in the tank, and arranged to rotate about a central vertical axis. The rotor is provided with a central opening at the bottom end thereof and with a plurality of flow passageways arranged around the central vertical axis between spaced upper and lower curved rotor walls, said flow passageways extending upwardly from said central opening and outwardly to the outer periphery of the rotor. Each of the flow passageways is provided with an inlet opening communicating with said central opening and with an outlet opening at said outer periphery of the rotor, the outlet openings being disposed at a greater radius than that of the inlet openings, so that upon rotation of the rotor centrifugal force develops in the flow passageways and discharges the liquid therein outwardly through the outlet openings into the tank and continuously draws liquid upwardly from below the rotor through said central opening into the flow passageways to be discharged again and circulated through the tank.

For an economical and efficient operation of this type of surface aerators, it is necessary to make the rotors of light weight, so that simple and lightweight bridges and carrier structures can be used for mounting the rotors above the tank, and that owing to small vertical loads the bearings and driving gears will be subject to reduced wear and their useful life will be extended. Also the energy required for driving the rotor shall be as small as possible and this requires that favorable flow conditions are to be created for the liquid conveyed by the rotor and the liquid circulating in the tank, in order to keep the frictional losses of the liquid as low as possible.

In order to satisfy these conditions the surface aerator according to the present invention comprises a rotor which in use is partly submerged in the liquid in the tank, the portion of the rotor submerged in the liquid having an outer circumferential wall extending from the periphery of said central opening at the bottom of the rotor to the edge of the outlet openings of the flow passageways, said outer circumferential wall being formed as a straight frustoconical surface, the lower curved rotor wall outwardly limiting the flow passageways and said frustoconical outer surface defining a closed annular hollow space extending around the rotor.

This hollow annular space produces buoyancy of the rotor submerged in the liquid in the tank. The hollow space around the rotor can be filled with a light-weight synthetic foam material, whereby the stability of the shape of the outer rotor wall is increased and any penetration of liquid into the hollow space is prevented even when the rotor wall, for any reason whatsoever, should spring a leak. Owing to buoyancy produced by the provision of the hollow space, the weight of the rotor, together with the additional weight becoming effective due to partial vacuum produced by the liquid ejected through said flow passageways when the rotor operates, can be partially or entirely compensated.

In this manner the buoyancy of the rotor due to the hollow space creates a force which continuously acts in opposition to the weight of the rotor and to the downwardly acting suction force, whereby the stresses and friction effective in the bearings are reduced and accordingly the mechanical efficiency is increased.

Moreover, due to the outer circumferential wall of the portion of the rotor submerged in the liquid being formed as a straight frustoconical surface, no vortices will form in the liquid circulating in the tank when it flows along this surface and relatively thereto, so that the frictional losses along the walls of the rotor operating in the liquid will be extremely small.

The invention will now be more fully described with reference to the accompanying drawings showing several embodiments of a surface aerator according to the invention.

FIG. 3 is an axial section of a modified aerator;

FIG. 4. is a plan view of the aerator according to FIG. 3, the upper shroud of the aerator having been removed in the righthand half of the FIGURE:

FIG. 5 is a fragmentary view in elevation, in the direction of the arrow $a$ in FIG. 4;

FIG. 6 shows a further modified aerator in axial section;

FIG. 7 is a plan view of the aerator of FIG. 6 with the upper shroud removed;

FIG. 8 is a fragmentary view in elevation showing the outlet openings of the aerator guide passages seen in the direction of the arrow $b$ in FIG. 5.

Figure 1:
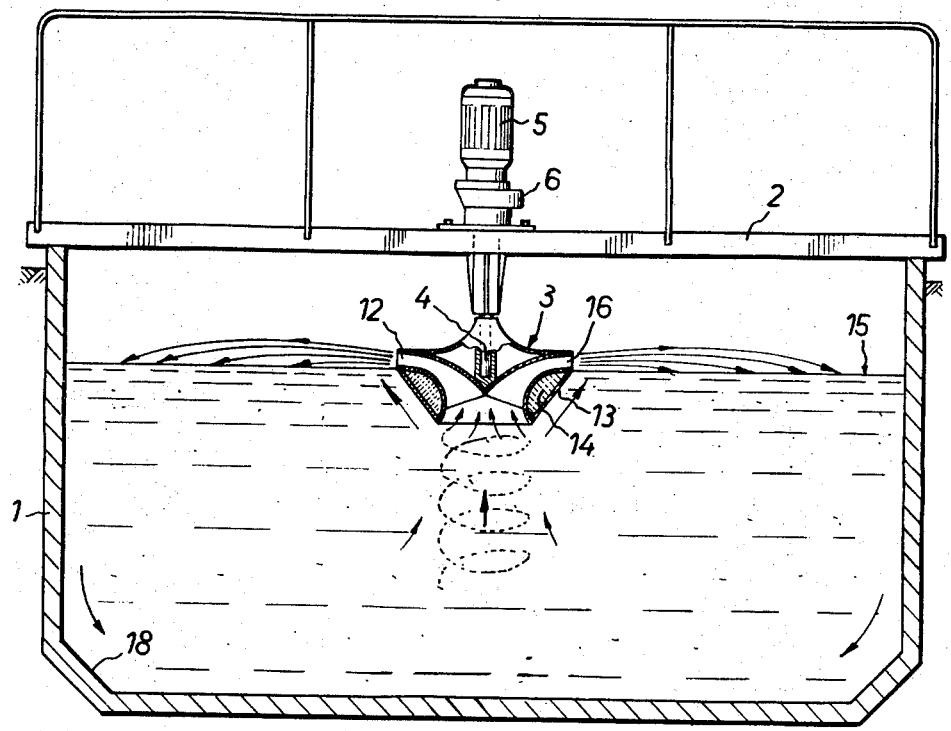
FIG. 1 is a vertical section through a liquid aeration tank with the aerator in operating position in the liquid to be aerated.

Referring to the drawings, the aerating tank for sewage treatment shown in FIG. 1 may be of circular, square or rectangular shape in plan view. A bridge 2 is arranged above the tank and carries the surface aeration rotor 3. The rotor is suspended on a vertical shaft 4 driven by a motor 5 by the intermediary of a gear 6. The motor is arranged to drive the aeration rotor 3 in clockwise as well as in counterclockwise direction.

Figure 2:
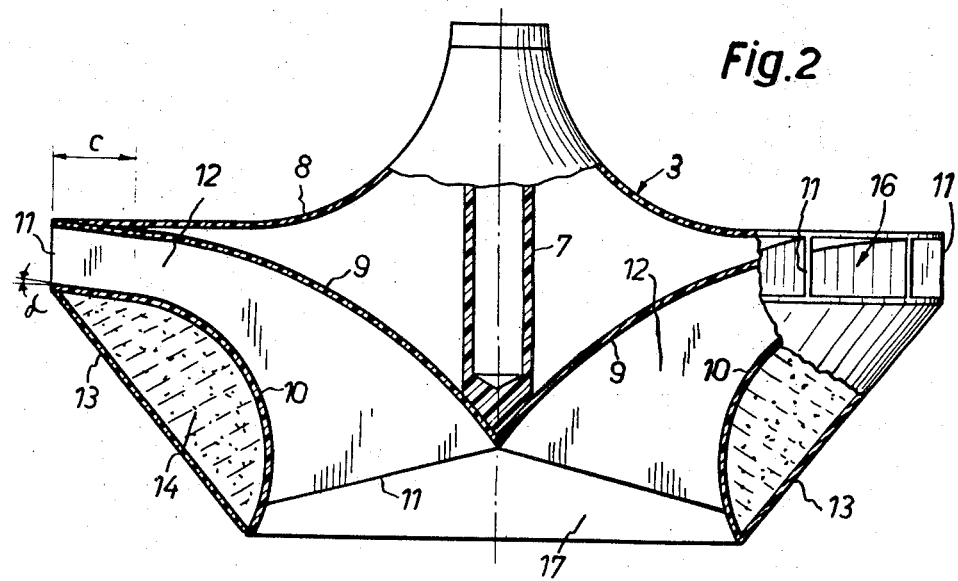
FIG. 2 illustrates the aerator in axial section drawn to a larger scale.

As is represented in FIG. 2 to a larger scale, the aeration rotor 3 is formed as an axially symmetrical body preferably made of plastics material, for example of glassfiber reinforced polyester. This body comprises a cylindrical hub member 7 serving for fixing the rotor 3 to its drive shaft 4. An upper circular shroud member 8 is rigidly connected with the upper end of the hub member 7. The rotor also comprises an inner shroud member 9 which, in cross section is substantially circularly curved between the axis of the rotor and its outer periphery, and which is rigidly connected with the upper shroud member 8 at its outer periphery, and with the hub member 7 at its central portion. An outer annular shroud member 10 also is circularly or elliptically curved in cross section. Substantially radial rotor blades 11 divide the annular space between the shroud members 9 and 10 into a plurality of flow passages 12. The blades 11 extend substantially in radial direction with a slight curvature from the lower inlet end 17 of the rotor flow passages to the outlet end 16 at the upper outer periphery of the rotor. The outer rotor wall 13 below the outlets 16 is immersed into the liquid in the tank when the rotor operates and is formed by a circular straight frustoconical surface. This surface 13 together with the shroud wall 10 limiting the flow passages 12, defines an annular liquidtight hollow space 14. This space is filled with a specifically light-weight synthetic foam material, for example in such manner that a hole is provided in the wall 13 through which the components of a resin material to be foamed are poured into the empty space, whereafter the foaming reaction starts; after completion of the reaction the hole is definitely close.

The aeration plant represented in FIG. 1 operates as follows. The aeration rotor 3 is suspended on the drive shaft 4 at such a height with respect to the operating liquid level 15 in the tank 1, that the lower edge of the outlet openings 16 of the rotor flow passages 12 are substantially situated flush with the liquid level 15. The flow passages 12 accordingly are filled with liquid up to the height of the liquid level 15. As soon as the motor 5 is switched on and the rotor 3 operated, the liquid within the flow passages 12 is subject to the action of centrifugal force and is raised within the flow passages and expelled at the outer periphery of the rotor through the outlet openings 16. A vacuum is thus formed at the inlet end 17 of the rotor immersed into the liquid in the tank, this vacuum causing liquid to be drawn into the flow passages from the tank volume below the rotor, at the same ratio as liquid is expelled through the outlets 16, thus liquid being continuously, raised through the passages 12 and expelled in radial, substantially horizontal direction through the outlets 16. As long as the rotor 3 is rotated, the liquid in the tank 1 is maintained in continuous circulation. Owing to the rotation of the rotor 3 immersed in the liquid, the whole contents of the tank 1 will gradually create a continuous slow rotation of the body of liquid in the tank.

FIG. 2 shows that the outer end portion of the upper and lower walls of the flow passages 12, for a length $c$, are straight and slightly upwardly inclined relative to the horizontal. While the walls 9 and 10 of the flow passages in cross section are approximately of circular curvature from the bottom end until the end portion $c$, this outer end portion of the walls 9 and 10 forms an angle $\alpha$ with the horizontal of about 5° to 6°, preferably 5.5°. The liquid drawn in at the bottom opening 17 of the rotor and continuously expelled through the outlets 16 spreads fanlike over the surface of the body of liquid in the tank until the sidewall of the tank. The radially flowing liquid on the surface 15 of the body of liquid is downwardly deflected by the sidewall of the tank and owing to the slow circular movement of rotation of the liquid in the tank each liquid particle in the tank will effect a helical movement from the liquid level 15 downwards towards the tank bottom. The inclined wall portions 18 between the sidewall and the bottom of the tank, deviate the liquid particles radially inwards along the bottom of the tank towards the center thereof. In the center of the tank the liquid is subjected to the action of the vacuum created at the bottom end of the rotor 3 and will flow upwardly in a central helically whirling liquid column 19 towards the entrance 17 of the rotor. The inner portion of this whirling liquid column enters through the inlet 17 into the flow passages 12 and is raised again therein and expelled in radial direction through the outlets 16. The peripheral portion of the liquid column 19 rising in the center of the tank, which will impinge against the rotor wall outside of the inlet opening 17, will flow upwardly along the circular cone surface 13 and at the level of the outlet openings 16, is deviated radially by the liquid expelled through the outlets 16 and will again circulate together with the liquid expelled from the flow passages 12 by centrifugal force. In this manner, the entire contents of the tank 1 are kept in continuous circulation.

The separation of the liquid conveyed by the rotor into individual liquid streams by the flow passages 12 and expelling the liquid on the level of the liquid in the tank results in an intense aeration of the expelled liquid and the surface layers of liquid in the tank. When the rotor moves, waves will be formed on the liquid surface by the outlet edges of each blade 11 at the outer periphery of the rotor, and these waves will extend until the sidewall of the tank. Continuously liquid is expelled out of the outlets 16 and thrown on the surface waves over a large area of the liquid level in the tank. The surface of the liquid in the tank in this manner is continuously roughened up and the boundary layer surface between the liquid and air is increased to thereby intensify the diffusion of air or oxygen in the liquid.

While in known aeration rotors of similar type, for example in aeration plants according to Swiss patent specifications 439.139 or 443.165, the external shroud of the rotor is formed by an annular wall of circularly concave shape in cross section, as the wall 10 (FIG. 2) of the rotor herein described, in the present invention the concave wall 10 is concealed by the outer straight conical wall 13. Experience has shown that in aerators of the mentioned known type in which the curved wall 10 forms the outer shroud in contact with the liquid, turbulence is tending to build up in the liquid layers flowing along this outer curved wall. The vortices thus formed along the curved surface increase the friction between the turning rotor and the liquid, which will unfavorably affect the efficiency of the rotor, since the energy required for operating the rotor will be increased. When, however, the exterior wall 13 forms a straight inverted frustoconical surface as shown in FIGS. 1 and 2, the surface area of the rotor wall in contact with the liquid is the smallest and no turbulence is formed in the liquid layers close to the straight wall 13. The frictional losses of the moving rotor immersed in the liquid are the smallest when the outer contour of the rotor is of frustoconical shape as shown.

Practical tests have shown that a rotor according to FIG. 2 having a straight outer wall and in which the flow passage outlets are upwardly inclined through a small angle $\alpha$ of 5° to 6° relatively to the horizontal, an increased aeration capacity will be obtained with respect to the known types of rotors according to the mentioned prior specifications. Under identical operating conditions the rotor according to my present invention will diffuse a quantity of oxygen, kgs. 0 per hour, in the liquid to be treated, which is 15 percent higher than with the aerator rotors of known type, and the quantity of oxygen diffused per kw. hour, kgs. 0/kwh, also is 15 percent higher.

A further important advantage is obtained by the described rotor owing to the large hollow space volume contained between the two walls 10 and 13. The rotor immersed into the liquid in the tank not only is kept in floating condition, but it will be buoyant. A reduced weight of a surface aeration rotor is advantageous in that the supporting bridge and carrier structure of the rotor above the tank can be constructed in more simple manner permitting to save structural material. Also, mounting of the rotor in the tank is simplified, since the rotor can be suspended on the drive shaft or removed therefrom in floating condition when the tank is filled with liquid. In a practical example of an aeration rotor having a diameter of 3 meters, its weight is approximately 450 kgs. When the rotor operates, the vacuum created owing to conveying and expulsion of liquid through the flow passages 12 acts on the vertical drive shaft of the rotor with a downwardly directed force equal to about an additional 500 kgs, so that the total weight of the aerator, without motor and driving gear amounts to approximately 950 kgs. The volume of the hollow space filled with foam between the two walls 10 and 13 results in a buoyant force of about 950 kgs. In operating condition of the rotor, its total weight is substantially balanced by its buoyancy. During operation of the rotor, accordingly no vertically acting loads are present, the load forces acting on the bearings and the frictional forces are reduced and the mechanical efficiency with respect to an aerator system having no buoyancy is increased. At the same time a prolonged operating life of the gear and of the bearings will result.

In the embodiment of the invention according to FIGS. 3 to 5 the aerating rotor comprises an upper shroud 8 and a plurality of flow passages 12 for the liquid which enters in vertical direction through the inlet opening 17 at the bottom of the rotor. Upon rotation of the rotor the liquid is raised by the action of centrifugal force and is expelled at the outer periphery of the rotor in radial direction. The flow passages 12 are defined between substantially radially directed blades 11, an upper and inner shroud wall 9 of circular curvature in cross section, and an outer and inner annular shroud wall 10 which is circularly or elliptically curved in cross section. The outer ends of these two shroud walls extend parallel with each other near the outlet ends of the flow passages 12 and are upwardly inclined at an angle of about 5° with respect to the horizontal. The outer curved annular shroud wall 10 is concealed by a straight frustoconical wall 13. The annular space 14 between the walls 10 and 13 is filled with a lightweight synthetic foam material 14.

An annular wall 20 extends at right angles to the rotor axis and is axially spaced below the upper shroud wall 8 of the rotor. The annular wall 20 is fixed at its inner periphery to the hub portion 7 and at its outer periphery to the inner shroud wall 9 limiting the flow passages 12. An annular space 21 is thus formed between the upper shroud 8, the wall 20, the hub portion 7 and the outer portion of the wall 9 of the flow passages 12. The upper shroud 8 is provided with five openings 22 serving to establish communication of the annular space 21 with the atmosphere. The wall 9 of the flow passage, which closes the space 21 along its outer periphery, is provided with a number of narrow openings 23. One opening 23 is provided for each flow passage 12 in proximity to the concave side of the slightly curved blades 11. Each flow passage 12 thus communicates by the opening 23, the annular space 21 and the openings 22 with the atmosphere above the rotor.

When the aeration plant is operated, the rotor can be run in either direction of rotation as is indicated by the arrows d and e in FIG. 4. When the rotor runs in the direction of the arrow d, the direction of curvature of the blades 11 at the outlet of the flow passages 12 is slightly backwards, opposite to the direction of rotation. The outlet edges of the blades 11 will generate only a small amount of turbulence in the liquid discharged from the flow passages 12 and will spread the liquid gently over the liquid surface in the tank.

When the rotor runs in the direction of the arrow e, the blades 11 are slightly curved in the direction of rotation, thus creating a higher pressure onto the liquid being discharged from the flow channels, i.e. they provide an extra push on the discharged liquid. The stream of liquid at the outlet end of the passage is so to say torn off by the edges of the blades and the turbulence in the discharged liquid is increased due to the tearing action of the outlet edges of the blades turning in the direction of arrow e, thus creating an additional air or oxygen supply into the liquid discharging from the flow passages.

When the rotor runs in the direction of the arrow d the liquid passing through the flow passages 12 will bank up against the leading convex side of the blades 11 and will be discharged from the passages 12 along the convex side of the blades and the diffusion of air or oxygen in the liquid will be reduced. By reversing the direction of rotation of the rotor, it is possible to increase the aeration capacity of the tank. Thus, when the rotor runs in the direction of the arrow e, the liquid passing through the flow passages 12 will bank up against the concave side of the blades 11 where the top wall 9 of the flow passages is provided with the openings 23 communicating with the atmosphere above the rotor. Due to the great speed of the liquid passing in front of the openings 23, this liquid exerts a suction action in the annular space 21. Air is drawn through the shroud openings 22 which are situated above the liquid level in the tank, into the annular space 21 and from there the air is sucked through the openings 23 into the passing liquid according to the principle of a water jet pump. This air together with the liquid in the flow passages 12, is discharged as a liquid/air mixture from the outlets of the flow passages.

When the rotor runs in the direction of the arrow e the diffusion of air or oxygen in the liquid in the tank (kgs. $O_2$/h) is considerably increased with respect to the oxygen diffusion obtained when running the rotor in the direction of the arrow d, since the end of the blades 11, with the concave sides of the blades leading, provide an increased turbulence on the liquid surface in the tank, and additional air is sucked in through the openings 23 and mixed with the liquid. The amount of oxygen diffused in the liquid in the tank, when the rotor runs in the direction of the arrow e can reach twice the amount of oxygen diffused when the rotor runs in the direction of arrow d. It is accordingly possible to adapt the operation of the aeration plant in simple manner, by reversing the direction of rotation of the rotor, to the varying demands of oxygen required by the particular kind of sludge being treated.

The modification of the rotor shown in FIGS. 6, 7 and 8 is similar to the rotor illustrated in FIGS. 3, 4 and 5, with the exception that the annular space 21 between the horizontal rotor walls 8 and 20 is open towards the side of the outlets of the flow passages 12, the rotor wall 9 forming the inner and upper limiting wall of the flow passages extending only from the entrance 17 of the flow passages to the rotor wall 20. At the place where the space 20 communicating with the atmosphere by the openings 22 in the shroud wall 8, opens into the flow passages 12 the inner edge 11' of the blades 11 is visible.

This rotor also can run in either direction of rotation. Since there is no separation between the outer periphery of the annular space 20 and the flow passages 12, air will always be drawn into the flow passages 12 through the openings 22 and mixed with the liquid, whether the rotor runs in the direction of the arrow d or the arrow e.

I claim:

1. A rotor for surface aeration and circulation of liquid in a tank, particularly of sewage and the like, said rotor being arranged to rotate about a central vertical axis and having a central opening at the bottom end thereof, a plurality of flow passageways arranged around said central vertical axis of the rotor between spaced upper and lower curved rotor walls, and extending upwardly from said central opening and outwardly to the outer periphery of the rotor, each of said flow passageways having an inlet opening communicating with said central opening and an outlet opening at said outer periphery of the rotor, said outlet opening being disposed at a greater radius than that of the inlet opening, and an outer circumferential wall extending from the periphery of said central opening at the bottom of the rotor to the edge of said outlet openings at the outer periphery of the rotor, said outer circumferential wall being formed as a straight frustoconical surface, said lower curved rotor wall and said frustoconical outer surface defining a closed annular hollow space in order to reduce the weight of the rotor when immersed in the liquid in operating position.

2. Apparatus for surface aeration and circulation of liquid, particularly of sewage and the like, comprising a tank adapted to contain a body of liquid and an aeration rotor positioned within the tank and arranged to be partially submerged within the body of liquid therein, said rotor being arranged to rotate about a vertical axis, the rotor including an upper wall being disposed transversely of the vertical axis of the rotor, a lower annular shaped wall spaced below said upper wall and having a central opening therethrough, a plurality of generally axially extending laterally spaced blades disposed between and secured to said upper and lower walls and combining therewith to form a plurality of substantially radially extending flow passageways, each flow passageway having an inlet opening centrally located about the vertical axis of the rotor and distributed about said central opening in said lower wall, said inlet being arranged below the liquid level in the tank, each of said flow passageways having an outlet disposed at the outer periphery of said upper and lower walls of the rotor and being spaced above said inlets at substantially the liquid level in the tank, said upper and lower walls forming the flow passageways together with said blades having a generally vertical orientation at the inlet ends of the passageways and then curving continuously to a generally horizontal orientation at the outlet ends of the passageways for deflecting the flow of liquid through said passageways through substantially 90° to discharge the liquid substantially horizontally into the body of liquid in the tank at the liquid level, the portion of said rotor submerged in the liquid in the tank and extending between the circumferential upper and lower edges of said lower rotor wall being formed as a straight frustoconical surface, said lower rotor wall and said frustoconical surface defining an annular hollow space extending around the rotor.

3. Apparatus according to claim 2, in which the discharge end portion of said flow passageways is substantially rectilinear and upwardly inclined towards the outlet opening through an angle relative to the horizontal not exceeding 6°.

4. Apparatus according to claim 2, in which said hollow space between said circumferential frustoconical surface and said lower curved rotor wall is filled with a lightweight synthetic foam material.

5. Apparatus according to claim 2, in which said rotor is closed on the top by an annular plate extending from a hub portion of the rotor to the upper edge of the outlets of said flow passageways, and an annular space being provided communicating with the atmosphere by openings provided in said annular top closure plate and with said flow passageways, whereby, due to the suction action of the liquid flowing through said flow passageways, atmospheric air is drawn into said annular space through said openings and mixed with the liquid in the flow passageways.

6. Apparatus according to claim 5, in which said blades are curved in radial direction and each flow passageway being limited at one side by a convex curvature of a blade and the opposite side by a concave curvature of a blade, said annular space below said annular top plate extending from said hub portion outwardly to said upper rotor wall forming a limiting wall of said flow passageways, said upper rotor wall having openings therein disposed along the concave curvature of said blades, said openings establishing communication between said hollow space and said flow passageways.

7. Apparatus according to claim 5, in which said rotor turning about a vertical axis is operatively connected with driving means arranged to drive the rotor in one or the other direction of rotation.